(12) United States Patent
Klotzer

(10) Patent No.: US 9,897,894 B2
(45) Date of Patent: Feb. 20, 2018

(54) MORPHABLE IDENTITY, NETWORKABLE PHOTONIC QUANTUM LOGIC GATE SYSTEM AND METHOD

(71) Applicant: Daniel S Klotzer, University City, MO (US)

(72) Inventor: Daniel S Klotzer, University City, MO (US)

(*) Notice: Subject to any disclaimer, the term of this patent is extended or adjusted under 35 U.S.C. 154(b) by 1291 days.

(21) Appl. No.: 13/735,823

(22) Filed: Jan. 7, 2013

(65) Prior Publication Data

US 2014/0192390 A1    Jul. 10, 2014

Related U.S. Application Data

(63) Continuation-in-part of application No. 12/655,792, filed on Jan. 6, 2010, now Pat. No. 8,350,211, which is a continuation-in-part of application No. 10/757,615, filed on Jan. 13, 2004, now Pat. No. 7,777,177.

(60) Provisional application No. 60/439,712, filed on Jan. 13, 2003.

(51) Int. Cl.
    *G02F 3/00* (2006.01)
    *G02F 1/35* (2006.01)

(52) U.S. Cl.
    CPC .............. *G02F 3/00* (2013.01); *G02F 1/3511* (2013.01)

(58) Field of Classification Search
    CPC ... G02F 3/00; G02F 3/02; G02F 3/024; G02F 1/3511; G02F 1/0126; G02F 1/293; G02F 1/3515; G02F 1/10338; G02F 1/0541
    USPC ........................................................ 359/108
    See application file for complete search history.

(56) References Cited

U.S. PATENT DOCUMENTS

| | | |
|---|---|---|
| 6,298,180 B1 | 10/2001 | Ho |
| 6,430,345 B1 | 8/2002 | Dultz et al. |
| 6,462,877 B1 | 10/2002 | Hait |
| 6,473,541 B1 | 10/2002 | Ho |
| 6,483,592 B2 | 11/2002 | Pedigo |
| 6,522,749 B2 | 2/2003 | Wang |
| 6,633,053 B1 | 10/2003 | Jaeger |
| 6,646,727 B2 | 11/2003 | Saleh et al. |
| 6,678,054 B1 | 1/2004 | Dress et al. |

(Continued)

OTHER PUBLICATIONS

E. Knill, R. Laflamme, & G. J. Milburn; A Scheme for Efficient Quantum Computation with Linear Optics; Nature; Jan. 4, 2001; pp. 46-53; vol. 409; Macmillan Magazines Ltd.; London, England.

(Continued)

*Primary Examiner* — Stephone B Allen
*Assistant Examiner* — Jyotsna Dabbi
(74) *Attorney, Agent, or Firm* — Klotzer Patents LLC; Daniel S. Klotzer

(57) ABSTRACT

Systems and methods of performing logical operations with photonic quantum logic gates. The logic gates utilize photon states, usually orthogonal linearly polarized states, to selectively enact self-interference operations whose outputs can be altered by inducing phase shifts in one or more portions of the section of the logic gate where the photon states undergo self-interference. The polarization direction switchings are differentially enacted and/or not enacted, in groupings of switches, to perform various logic operations. Additionally, networked logic gates with interrelated self-interference section phase shifts and output states are described that provide additional capabilities.

20 Claims, 2 Drawing Sheets

(56) References Cited

U.S. PATENT DOCUMENTS

| | | | |
|---|---|---|---|
| 6,678,450 B1 | 1/2004 | Franson | |
| 6,788,838 B2 | 9/2004 | Ho | |
| 6,801,626 B1 | 10/2004 | Nambu | |
| 6,909,497 B2 | 6/2005 | Holbrook | |
| 2005/0259999 A1* | 11/2005 | Covey | G02F 3/00 398/188 |
| 2010/0114805 A1* | 5/2010 | Klotzer | B82Y 10/00 706/13 |

OTHER PUBLICATIONS

Philippe Grangier, Juan Ariel Levenson & Jean-Philippe Poizat; Quantum Non-Demolition Measurements in Optics; Nature; Dec. 10, 1998; pp. 537-543; vol. 396; Macmillan Magazines Ltd.; London, England.
George I. Stegeman and Colin T. Seaton; Nonlinear Integrated Optics; Journal of Applied Physics; Dec. 15, 1985; pp. R57-R78; vol. 58; American Institute of Physics; Melville, NY.

* cited by examiner

MORPHABLE IDENTITY, NETWORKABLE PHOTONIC QUANTUM LOGIC GATE SYSTEM AND METHOD

CROSS-REFERENCE TO RELATED APPLICATIONS

This application is a continuation-in-part of U.S. Non-Provisional Utility patent application Ser. No. 12/655,792 (to be issued as U.S. Pat. No. 8,350,211 on Jan. 8, 2013,) filed Jan. 6, 2010, and claims the benefit of its priority date; The Ser. No. 12/655,792 application is a continuation-in-part of U.S. Non-Provisional Utility patent application Ser. No. 10/757,615 (issued as U.S. Pat. No. 7,777,177 on Aug. 17, 2010), filed Jan. 13, 2004, and claims the benefit of its priority date as does the present application; the Ser. No. 10/757,615 application priority date stems from U.S. Provisional Utility Patent Application Ser. No. 60/439,712, filed Jan. 13, 2003, which is also the priority date claimed by the present application; and the entire disclosures of all of the U.S. Non-Provisional Utility patent application Ser. No. 12/655,792, the U.S. Non-Provisional Utility patent application Ser. No. 10/757,615, and the U.S. Provisional Utility Patent Application Ser. No. 60/439,712, are hereby incorporated herein by reference.

STATEMENT REGARDING FEDERALLY SPONSORED RESEARCH OR DEVELOPMENT

Not applicable.

BACKGROUND OF THE INVENTION

Field of the Invention

The present invention relates generally to systems and methods of implementing logic gates with photons, and more particularly to implementing such gates both with quantum computing capacities as well as modifiability of the character of the logical operation thereby enacted.

Related Art

The substantial significance and benefits of information processing in modern society cannot be disputed, and hence there is an ever present imperative to seek ever more powerful, more efficient, faster, and less costly means of processing information. The advances and rewards of the electronic integrated circuit on silicon chip approach to information processing are major, and will continue to improve in the future. However, this approach, like all technologies, has substantial constraints as well, including considerable power consumption, heat generation, computational efficiency, and potential technical roadblocks that may hamper, prevent, or at least greatly complicate achieving continuing advances. One alternative approach that is receiving increasing attention is information processing through the manipulation of photons (light quanta.)

Another alternative approach has been given the label of quantum computation and involves utilizing principles of quantum mechanics to accomplish manners and powers of computation that are not practically achievable with integrated circuits on silicon chips. The capacities of quantum computing are only beginning to be explored, though it is known that it can provide capabilities that are not attainable via conventional technologies for computing.

A substantial number of techniques and achievements in the field of photonic manipulation, computation, and quantum computation have been effected, and are being researched. A number of these efforts are hereby incorporated by reference, as described in the United States published patent database. It should be understood that these references are incorporated solely for their efficacy in describing the various technical capacities that exist at preset, for purposes of enablement of the embodiments of the present invention disclosed herein. In no way are these considered to be prior art, nor are they anticipatory nor do they render obvious any of the present application. Additionally, in some of the incorporated references, there may be assertions of judgment and/or characterization that can be construed to be subjective in some way and these are not a part of the present application. These references' incorporation is solely intended to provide further details of a variety of manners of effecting some of the techniques utilized in the present invention, since the enablement is judged at the time of filing and does not adjust for the present application's claim of earlier priority. With these limitations understood, the references incorporated herein by reference are U.S. Pat. Nos. 6,298,180, 6,473,541, 6,633,053, 6,678,450, 6,788,838, 6,819,474, 7,180,645, 7,498,832, 7,714,605, 7,791,780, 7,836,007, 7,844,152, 7,925,131, and 8,031,985, as well as United States Published Patent Application Nos. 20080310000, 20100098373, and 20120039560 as contributing context to explicate the technical capacities available to achieve the operations of the embodiments of the present invention.

SUMMARY OF THE INVENTION

It can be argued that the bricks which modern information processing is built from are logic gates that are combinations of specific input/output relationships in groupings which effect certain logic operations. In general, these operations are often defined by truth tables, and the specification of the values of inputs and outputs of such a truth table essentially defines the character of a particular logic gate. Additionally, it has been shown that all logic gates can be constructed from the functions of either of two "universal" logic gates: the NOR gate and the NAND gate. A NOR gate is defined by the truth table:

| INPUT | | OUTPUT |
|---|---|---|
| A | B | A NOR B |
| 0 | 0 | 1 |
| 0 | 1 | 0 |
| 1 | 0 | 0 |
| 1 | 1 | 0 |

A NAND gate is defined by the truth table:

| INPUT | | OUTPUT |
|---|---|---|
| A | B | A NAND B |
| 0 | 0 | 1 |
| 0 | 1 | 1 |
| 1 | 0 | 1 |
| 1 | 1 | 0 |

The values defined in a truth table are symbolic, since they were initially devised in the field of logics, often considered a sub-branch of philosophy (or mathematics,) although in regard to information processing they are almost always represented as ones and zeros since modern computing involves binary representations of data. The full range of the embodiments of the present invention are capable of effecting virtually any logic operation expressed in essentially any logic gate, as well as numerous operations that represent combinations of logic gates, but for purposes of clarity of expression, the NOR and NAND gates are discussed in detail, with the understanding that their capacities' implementation also capacitates the execution of any other logic gate due to their "universality." Additionally, the capacities of the various embodiments of the present invention provide information processing capabilities that even exceed presently known logic operations.

Presently, the vast majority of physical implementations of information processing utilize the aforementioned electronic integrated circuit, though increasing progress has been made towards developing photonic alternatives. Substantial technical issues have been surmounted, and additional issues are being solved at ever faster rates, such that it has become clear that photonic computing is on a path to be widely implemented. Certain technologies, such as fast optical/electrical switches, and improvements in scale, reliability, economics, and versatility of photonic techniques such as controllable single photon sources, that are existing or are in development will enhance and/or be integrated in realizations of the present invention, but their enablement is not necessary to fully describe herein since their advances are not the subject of the present application. The embodiments of the present invention are fully realizable with present technology, though the quality, expense, and range of application of these embodiments are almost certain to be improved as these related technologies improve, and it should be understood that the combination of these technologies, both existing and forthcoming, are fully encompassed by the present invention, when combined with the embodiments disclosed herein.

Among the extended capacities available from differing embodiments of the present invention are those which are afforded through the utilization of the principles of quantum mechanics that, when combined with the enactment of logic gates, is generally labeled as quantum computing. Among the advantages that quantum computing provides is the capacity for a bit to assume superpositions of differing values of the bits, so that a single operation can calculate on a potentially unlimited number of varying inputs, as well as a single operation effecting a potentially unlimited number of actions due to the size of this potential input set. The computational challenges in effecting quantum computing are not small though, and they include in many situations the need for substantial new software and hardware developments to realize the promise of quantum computing. While the present invention does not forego capturing all of the potential promise that quantum computing could unveil, one particular benefit of many embodiments of the present invention is its capacity to provide many of the advantages, both current and potential, of both optical and quantum computing benefits.

Primarily for enablement reasons, and in order to establish the present state of the art represented as the knowledge possessed by a PHOSITA (Person of Hypothetical Ordinary Skill In The Art,) a number of references are incorporated herein by reference to delineate some of the range of currently well-known techniques which are available to realize various aspects of various embodiments of the present invention. These references include both patent and non-patent literature, and they describe techniques which range from the theoretical through to those in testing and on to those already being industrially utilized. It should be understood however, that the incorporation and or listing of any reference or technique is explicitly not an admission or description that that reference or technique is prior art, but rather is only a description of varying manners of realizing various embodiments of the present invention. The embodiments of the present invention are already reduced to practice, and due to the early priority of the parent applications to the present application the vast majority, if not all, of these reductions to practice actually predate the material that will be incorporated by reference subsequently. And while priority is determined by the earliest explication of the parent application(s), enablement is defined in terms of the state of knowledge on the filing date of the present application, and hence references that are not prior art to the present application are still incorporated by reference for that reason. The embodiments of the present invention explicated in detail here include certain forms of optical equipment, such as beam splitters and half-wave plates, though the range of well-known equipment types that are incorporable with the embodiments of the present invention are not limited in principal or practice, and the inclusion of any of these equipment types should be understood to fall within the scope of the present invention.

Of particular interest in the realm of photonic tools are developments in the field of non-linear Kerr media and their capacities to enable both non-destructive registration of the presence of a photon as well as to enable a non-destructive phase change in a traversing photon. The phase changes in a photon traversing a non-linear Kerr media are also responsive to the presence of any other photon that is concurrently traversing the non-linear Kerr media. Historically, this phase change had been limited to relatively small changes in phase, much less than $\pi$, so that substantial changes in phase required massive numbers of photons, even approaching orders of magnitude of $10^{10}$ up to $10^{20}$ or more. More recently, a host of new tactics are being researched and much progress had been made towards the accomplishment of a long sought goal: phase changes of a traversing photon state fully equal to $\pi$ and solely induced by the presence of a single additional traversing photon state. Among the approaches being developed, and utilized, are micro-ring resonators and chiral structures, as well as others, and the inclusion of these and other, and future approaches are within the scope of the present invention.

In broad terms, a number of embodiments of the present invention employ switchable photonic self-interference arrangements that are alterable via various ways of shifting the phase of a photon (a number of techniques for phase shifting have been developed and heavily utilized for decades, as described in the present application's parent applications, as well as the references incorporated herein by reference.) A first particular way of enacting a phase shift involves another photon occupying an optical Kerr media concurrently with one or more of the states of the self-interfering photon. When the concurrent occupations occur they modify the phase of a portion of the photon state undergoing self-interference, such that a photon in that state outputs from the self-interference arrangement via a differing path than it would if there were not concurrent occupations. The two output paths are separately routed with one passing through a half-wave plate (as an example, but there are also many other well-known techniques for switching the polarization direction of linearly polarized photon, and the present invention should be considered to be limited to any one specific option.) The paths are then combined into a single output path. For purposes of clarity of description, The vast majority of the present application describes the present invention in terms of the linear polarization states horizontal and vertical (H and V), but it should be understood that the embodiments of the present invention can be utilized, with appropriate modifications, with almost any pair of orthogonal basis states of a photon, including circular polarization states, and other basis vectors as well. The combination of the self-interference arrangement and the conditional polarization direction switch plus the recombination of paths is collectively herein termed a quantum modifier. Embodiments will often employ pairs of these quantum modifiers, one for each polarization basis state. Frequently, a polarizing beam splitter divides the H and V photons and routes each as input to a separate quantum modifier. The results of the operations of the pair of modifiers is then combined into a single (occupied) end output path for registration or subsequent processing. The modifiers (whether before, during, or after the self-interference arrangement) can be mutually interactive, as well as interacting with external phase shifting sources. In particular, the modifiers of a first logic gate can interact with the modifiers of a second logic gate, which can in turn interact with the first logic gate as well as a third, or more, additional logic gates. Combined, complexly interacting networks of logic gates are hence realizable.

A number of varying embodiments fall within the scope of the present invention. A first embodiment is characterizable as a photonic quantum logic gate with modifiable logic operation characteristics, comprising a first quantum differentiator that separates first and second orthogonal states of a first photon and inputs each for individual processing by first and second quantum modifiers, respectively; said modifiers' processing involving a self-interference section operating in either a first or a second mode which output, respectively, either the same or the alternative of the input state; at least a first path of at least one state of at least a second photon arranged to alter the mode of self-interference undergone by at least one of the first photon's states in at least one of the modifiers; and a quantum integrator that assembles the first and second modifiers' outputs and channels them into a single unified output.

A second embodiment is characterizable as a photonic quantum logic gate with modifiable logic operation characteristics in accordance with the first embodiment, further comprising a second quantum differentiator that separates the first and second orthogonal photon states of the at least a second photon, and routes said states onto the first and a second path, respectively, such that at least one of the second photon's states alters the mode of self-interference undergone by at least one of the first photon's states in at least one of the modifiers.

A third embodiment is characterizable as a photonic quantum logic gate with modifiable logic operation characteristics in accordance with the second embodiment, wherein groupings of the self-interference mode alterations spanning complete sets of permutations of the first and second photons' states are arranged to enact one or more logical operations.

A fourth embodiment is characterizable as a photonic quantum logic gate with modifiable logic operation characteristics in accordance with the second embodiment, wherein the self-interference mode alterations are engendered by routing at least a first portion of at least one of the modifiers' self-interference sections and by routing at least one of the second photon's states to both pass through at least a first Kerr media; said routings arranged so that when they are occupied the first and second photons traverse the first Kerr media concurrently to induce optical Kerr effect phase shifts that produce the alterations in the mode of self-interference of the first photon.

A fifth embodiment is characterizable as a photonic quantum logic gate with modifiable logic operation characteristics in accordance with the third embodiment, wherein the first and second orthogonal photon states correspond to logical 0's and 1's, respectively, and the first and second photons correspond to the A and B inputs, respectively, of a standard logic table representation of a logic gate, and said logic operation is a NOR gate.

A sixth embodiment is characterizable as a photonic quantum logic gate with modifiable logic operation characteristics in accordance with the third embodiment, wherein the first and second orthogonal photon states correspond to logical 0's and 1's, respectively, and the first and second photons correspond to the A and B inputs, respectively, of a standard logic table representation of a logic gate, and said logic operation is a NAND gate.

A seventh embodiment is characterizable as a photonic quantum logic gate with modifiable logic operation characteristics in accordance with the second embodiment, with the first and second orthogonal photon states representing logical 0's and 1's, respectively, and the first and second photons representing the A and B inputs, respectively, of a standard logic table, wherein a NOR logic gate is engendered by said arranging entailing the second photon first state inducing the second mode of self-interference in both the first and second modifiers, and the second photon second state inducing the second mode of self-interference in only the second modifier.

An eighth embodiment is characterizable as a photonic quantum logic gate with modifiable logic operation characteristics in accordance with the second embodiment, with the first and second orthogonal photon states representing logical 0's and 1's, respectively, and the first and second photons representing the A and B inputs, respectively, of a standard logic table, wherein a NAND logic gate is engendered by said arranging entailing the second photon first state inducing the second mode of self-interference in only the first modifier, and the second photon second state inducing the second mode of self-interference in both the first and second modifiers.

A ninth embodiment is characterizable as a photonic quantum logic gate with modifiable logic operation characteristics in accordance with the second embodiment, wherein groupings of the self-interference mode alterations spanning complete sets of permutations of the first and second photons' states are arranged to enact one or more logical operations, and the self-interference mode alterations are engendered by routing at least a first portion of at least one of the first modifiers' self-interference sections and by routing at least one of the second photon's states to both pass through at least a first Kerr media concurrently; said groupings of alterations, and said logical operation being thereby enacted, being modifiable by modifying said routings and the Kerr media they concurrently traverse.

A tenth embodiment is characterizable as a method of operating a photonic quantum logic gate with modifiable characteristics, comprising the steps of differentiating first and second orthogonal states of a first photon and separately inputting each for individual processing by first and second quantum modifiers, respectively; said processing involving a self-interference procedure operating in either a first or a second mode which output, respectively, either the same or the alternative of the input state; arranging for at least a first path of at least one state of at least a second photon to alter the mode of self-interference undergone by at least one of the first photon's states in at least one of the modifiers; and integrating the first and second modifiers' outputs and channeling them into a single unified output.

An eleventh embodiment is characterizable as a method of operating a photonic quantum logic gate with modifiable characteristics in accordance with the tenth embodiment, further comprising the step of differentiating the first and second orthogonal photon states of the at least a second photon, and then routing them onto the first and a second path, respectively, such that at least one of the second photon's states alters the mode of self-interference undergone by at least one of the first photon's states in at least one of the modifiers.

A twelfth embodiment is characterizable as a method of operating a photonic quantum logic gate with modifiable characteristics in accordance with the eleventh embodiment, wherein groupings of the self-interference mode alterings spanning complete sets of permutations of the first and second photons' states are arranged to enact one or more logical operations, said self-interference mode alterings engendered by routing at least a first portion of at least one of the modifiers' self-interference sections and routing at least one of the second photon's states to both pass through at least a first Kerr media; said routings arranged so that when they are occupied the first and second photons traverse the first Kerr media concurrently to induce optical Kerr effect phase shifts that produce the alterings in the mode of self-interference of the first photon.

A thirteenth embodiment is characterizable as a method of operating a photonic quantum logic gate with modifiable characteristics in accordance with the eleventh embodiment, with said first and second orthogonal photon states corresponding to logical 0's and 1's, respectively, and the first and second photons corresponding to the A and B inputs, respectively, of a standard logic table representation of a logic gate; and wherein a NOR logic gate operation is engendered by said arranging entailing the second photon first state inducing the second mode of self-interference in both the first and second modifiers, and the second photon second state inducing the second mode of self-interference in only the second modifier.

A fourteenth embodiment is characterizable as a method of operating a photonic quantum logic gate with modifiable characteristics in accordance with the eleventh embodiment, with said first and second orthogonal photon states corresponding to logical 0's and 1's, respectively, and the first and second photons corresponding to the A and B inputs, respectively, of a standard logic table representation of a logic gate; and wherein a NAND logic gate operation is engendered by said arranging entailing the second photon first state inducing the second mode of self-interference in only the first modifier, and the second photon second state inducing the second mode of self-interference in both the first and second modifiers.

A fifteenth embodiment is characterizable as a method of operating a photonic quantum logic gate with modifiable characteristics in accordance with the eleventh embodiment, wherein groupings of the self-interference mode alterations spanning complete sets of permutations of the first and second photons' states are arranged to enact one or more logical operations, and the self-interference mode alterations are engendered by routing at least a first portion of at least one of the first modifiers' self-interference procedures and by routing at least one of the second photon's states to both pass through at least a first Kerr media concurrently; said groupings of alterations, and said logical operation being thereby enacted, being modifiable by modifying said routings and the Kerr media they concurrently traverse.

A sixteenth embodiment is characterizable as a network of photonic quantum logic gates that have modifiable logic operation characteristics, comprising first and second photonic logic gates operating on entering first and second photons, respectively, said gates each comprising, a first quantum differentiator that separates first and second orthogonal states of the entered photon and inputs said first and second states for individual processing by first and second quantum modifiers, respectively; said modifiers' processing involving a self-interference section operating in either a first or a second mode which output, respectively, either the same or the alternative of the input state; said self-interference mode undergone by at least one of the states of the entered photon in at least one of the first gate's modifiers being altered by at least one state of a different photon; and a quantum integrator that assembles the first and second modifiers' outputs and channels them into a single output; wherein at least one output state of the self-interference section of at least one of the first logic gate's quantum modifiers is arranged to function as said at least one state of a different photon that alters the self-interference mode undergone by at least one of the second photon's states in at least one of the second logic gate's modifiers.

A seventeenth embodiment is characterizable as a network of photonic quantum logic gates that have modifiable logic operation characteristics in accordance with the sixteenth embodiment, wherein the self-interference mode alterations are engendered by routing at least a first portion of at least one of said modifiers' self-interference sections and by routing said at least one states of a different photon to both pass through at least a first Kerr media; said routings arranged so that, when both are occupied, the occupying photon states traverse the first Kerr media concurrently to induce optical Kerr effect phase shifts that produce said self-interference mode alterations.

An eighteenth embodiment is characterizable as a network of photonic quantum logic gates that have modifiable logic operation characteristics in accordance with the sixteenth embodiment, further wherein at least one output state of the self-interference section of at least one of the second logic gate's quantum modifiers is arranged to function as said at least one state of a different photon that alters the self-interference mode undergone by said at least one of the first photon's states in said at least one of the second logic gate's modifiers.

A nineteenth embodiment is characterizable as a network of photonic quantum logic gates that have modifiable logic operation characteristics in accordance with the sixteenth embodiment, wherein at least one output state of the self-interference section of the second logic gate's first quantum modifier is arranged to function as said at least one state of a different photon that alters the self-interference mode undergone by the first photon's first state; and at least one output state of the self-interference section of the first logic gate's second quantum modifier is arranged to function as said at least one state of a different photon that alters the self-interference mode undergone by the second photon's second state.

A twentieth embodiment is characterizable as a network of photonic quantum logic gates that have modifiable logic operation characteristics in accordance with the sixteenth embodiment, wherein at least one output state of the self-interference section of the second logic gate's first quantum modifier is arranged to function as said at least one state of a different photon that alters the self-interference mode undergone by the first photon's first state; and at least one output state of the self-interference section of the first logic gate's first quantum modifier is arranged to function as said at least one state of a different photon that alters the self-interference mode undergone by the second photon's second state.

The full range of embodiments of the present invention also include permutations and combinations of the various sub-sections of the above embodiments, such as a network that interrelates three, four, or more logic gates, as well as multiple interconnections (for example, by arranging intersections with an extended Kerr media configuration for a multitude of the self-interference and/or self-interference output section paths) between various parts of one or more gates and with various parts of one or more other gates.

Other objects and features will be in part apparent and in part pointed out hereinafter.

DETAILED DESCRIPTION OF THE PREFERRED EMBODIMENTS

In the following description, identical numbers indicate identical elements. Where an element has been described in one Figure, and is unaltered in detail or relation in any other Figure, said element description applies to all Figures.

Primarily for purposes of clarity of illustration and description, the present drawing figures and their accompanying detailed descriptions of the embodiments in the figures are shown with straight paths for the photons such as they would exhibit when passing through space, but it should be understood that this is not limiting of the embodiments of the present invention. Essentially any manner of channeling and/or directing photons can also serve in the present invention, including optical fibers, rectangular wave guides on silicon chip, and others. Additionally, the utilizations of polarizing, symmetrical, and anti-symmetrical beam splitters are also not limiting of the types and varieties of equipment that can be used in the embodiments of the present invention, since it is only the resulting effects described that are of significance, and alternative means to achieve those effects are within the scope of the present invention, since these are well known and in many cases decades old devices. As used herein, the mirrors depicted as enacting the variety of direction changing actions on the photons are assumed to be non-phase shifting, i.e. they have glass on both sides of the reflecting layer, unless otherwise specified (such as when an anti-symmetrical mirror is utilized.)

Figure 1:
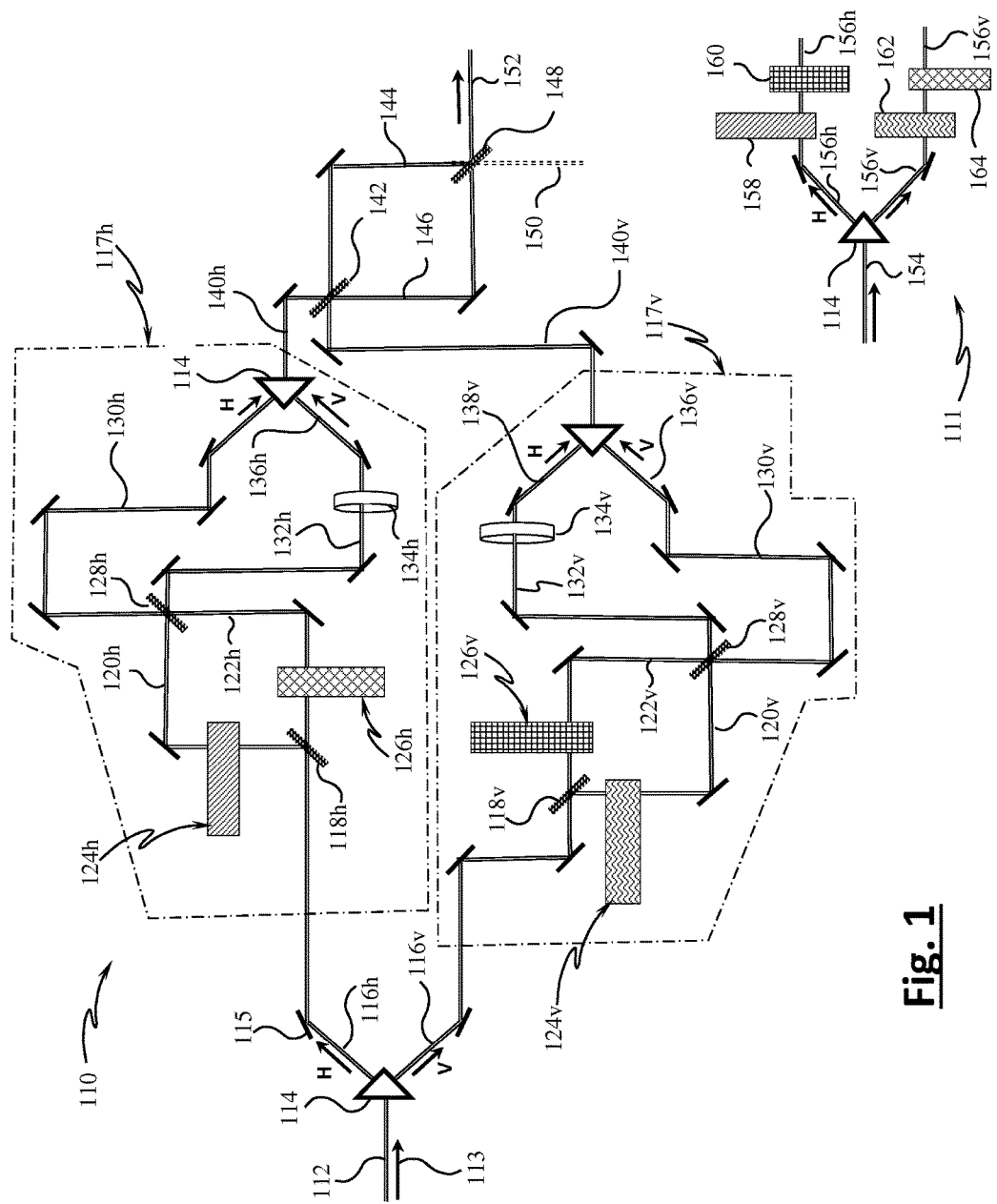
FIG. 1 is a schematic representation of a first logic gate embodiment of the present invention.

Depicted in FIG. 1 is a first logic gate embodiment that comprises a signal processor sector 110 and a control enactor sector 111 that interacts with the signal processor sector 110 to accomplish the operations of the first logic gate embodiment. A first photon in either the H or V state enters the signal processor sector 110 via the path 112 in travelling in the direction 113 to the polarizing beam splitter 114. Once passing through the polarizing beam splitter 114, the H state photons are directed onto path 116*h* (116*hv*) and the V state photons are directed onto the path 116*v*. The H state photon then enters the quantum modifier 117*h* (117*hv*) and the V state photon enters the corresponding quantum modifier 117*v*. The modifiers 117*h* (117*hv*) and 117*v* are essentially equivalent, and are depicted as mirror images, though their functions are fully analogous and the mirror imaging does not alter their performance. Some of the effects of the two quantum modifiers are correspondingly different, such as the quantum modifier 117*h* (117*hv*) potentially changing a H state photon into a V state photon, and vice-versa for quantum modifier 117*v*. Other differences will reflect the nature of the logic operation being enacted, and are primarily related to variations in which phase shifting potential interactions are actually realized in various combinations of the photon states entering the first logic gate embodiment. As stated earlier, the majority of the present description involves utilizing optical Kerr media to enact the phase shifting interactions prescribed by a given logic operation, though a wide variety of other well-known means are also within the scope of the present invention. Additionally, the details of the manner of a particular form of realization of an optical Kerr media are not the subject of the present application, sufficient manners of realization such as those mentioned and incorporated by reference do exist, and are effective. Improvements are also inevitably forthcoming and such are also utilizable in concert with the present invention. Hence, the manners of utilization of optical Kerr media in the present descriptions will be limited to statements of their specific use, with the understanding that the details are sufficiently well-known and public already.

The following description of quantum modifier 117*h* (117*v*) also serves to describe quantum modifier 117*v*, with the substitution of the "v" suffix for the "h" suffix. Upon inputting to quantum modifier 117*h* (117*v*), the H-state photon encounters 50-50 symmetrical (i.e. non-phase shifting reflections) beam splitter 118*h* (118*v*), and it becomes the state [H: $2^{-1/2}$ (120*h* (120*v*)+122*h* (122*v*))] which has equal probability amplitudes of traveling down both paths 120*h* (120*v*) and 122*h* (122*v*). A first optical Kerr media 124 *h* (124 *v*) is traversed by path 120 *h* (120 *v*), and a second optical Kerr media 126*h* (126*v*) is traversed by path 122*h* (122*v*), prior to the two paths crossing at anti-symmetrical beam splitter 128*h* (128*v*). The anti-symmetrical 50-50 beam splitter 128*h* (128*v*) is arranged so that the side which directs its reflections from path 120*h* (120*v*) to path 130*h* (130*v*) is not phase shifting while the side which directs its reflections from path 122*h* (122*v*) to path 132*h* (132*v*) does induce a $\pi$ phase shift in the state that takes path 132*h* (132*v*). Hence, if there are no phase shifts enacted by either of the optical Kerr medias 124*h* (124*v*) and 126*h* (126*v*), the photon state will take path 130*h* (130*v*) when exiting the anti-symmetrical beam splitter 128*h* (128*v*), while if either of the optical Kerr medias 124*h* (124*v*) and 126*h* (126*v*) do enact a phase shifts, the photon state exiting the anti-symmetrical beam splitter 128*h* (128*v*) will take path 132*h* (132*v*). When following path 132*h* (132*v*) the photon state will pass through half-wave plate 134*h* (134*v*) and be switched to a V photon now travelling along path 136*h* (136*v*). The two paths 130*h* (130*v*) and 136*h* (136*v*) are recombined by a reversed direction polarizing beam splitter 114 and output from quantum modifier 117*h* (117*v*) along path 140*h* (140*v*). The 50-50 symmetrical beam splitters, it is well known, are described herein as non-phase shifting when reflecting because they do not cause a shift of the real number component of the phase, but they do cause a shift of i of the imaginary component of the phase of the reflected photon state, i.e. a phase shift of $\pi/2$ in the imaginary plane. This is immaterial to the quantum modifiers 117*h/v* since the successive beam splitters 118 and 128 are arrangeable so that these i phase shifts cancel.) The paths 140*h* (140*v*) and 140v are then crossed at symmetrical 50-50 beam splitter 142, so that the exiting paths 144 and 146 are populated by identical states. The states following paths 144 and 146 are then re-crossed again at anti-symmetrical 50-50 beam splitter 148, which ensures that only output path 152 is populated, since path 150 will has a 0 probability amplitude of being populated. For the successive beam splitters 142 and 148, the photon's input path is 140h or 140v, respectively, depending on whether path 116h or 116v is populated. If the photon enters along path 140h, its reflected component acquires an i phase shift along path 144, while the reflected component will acquire an i phase shift along path 146 if the photon enters along path 140v. Compensation for this difference to ensure that only exit path 152 is occupied with selective phase shifting, executable with a number of well-known approaches, such as activatable wave plates (not shown) which can be selectively disposed along each of paths 144 and 146, activated by path counters (not shown) on paths 116h/v. If path counter 116h is actuated, then the phase shifter (including a micro-ring resonator variety,) on path 144 is activated to correct the i phase shift of the reflected component traversing that path. If path counter 116v is actuated, then the phase shifter on path 146 is activated to correct the i phase shift of the reflected component traversing that path.

A second, so-called control photon, designated as the b photon in the above detailed truth tables (and hence the photon traversing the signal processor sector 110 would be the a photon) inputs to the control enactor sector 111 along path 154 and traverses another polarizing beam splitter 114. As described previously, the polarizing beam splitter 114 sends H state photons along path 156h and V state photons along path 156v. The photon state traversing path 156h will also traverse potential optical Kerr medias 158 and/or 160 in potential concurrence with a photon state traversing optical Kerr medias 124h and 126v, respectively. The photon state traversing path 156v will also traverse potential optical Kerr medias 162 and/or 164 in potential concurrence with a photon state traversing optical Kerr medias 120v and 126v, respectively. When either concurrency is established, the photon state traversing the portion of the signal processor sector 110 that shares that concurrency will undergo a π phase shift, and hence will exit from the other path, either path 132h or path 132v, than if there is no phase shift from a concurrency. The paths 132v and 132h traverse the half wave plates 134h and 134v, respectively, and hence the photon state on that path has its direction of polarization switched (either from H to V, or from V to H,) and hence its binary value is switched, since the H photon state is taken as equivalent to a one in the truth table and a V photon state is taken as equivalent to the 0 in the truth table. The connections between the various optical Kerr media and the establishing of the particulars of the concurrencies are not inconsiderable achievements, but they execution and the issues involved have been well known for decades or longer, and are already well explained in many published texts including those incorporated by reference herein as well as the parent applications to the present application. The manners of utilizing these concurrencies to establish logical operations and logic gate varieties have already been described in the summary of the invention and will be explicated further in the claims.

Figure 2:
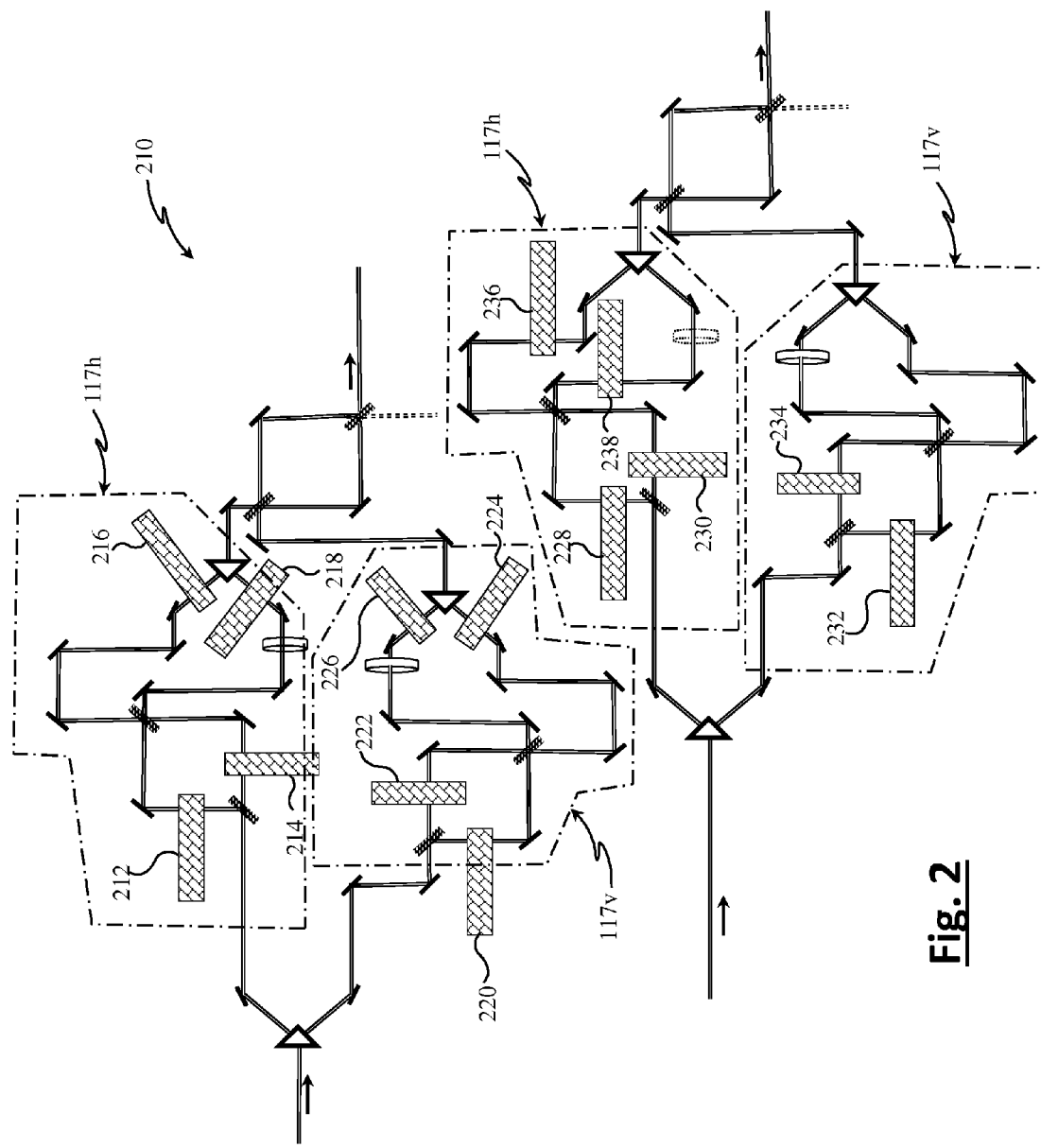
FIG. 2 is a schematic representation of a networked pair of logic gate embodiments of the present invention.

Depicted in FIG. 2 is a logic gate network embodiment 210 that comprises a pair of interrelated signal processor sectors 110 acting, depending on the various configurations arranged and the states being input, as control enactor sectors 111 for each other, as well as for other gates, again depending on the various configurations arranged and the states being input. In all of the embodiments depicted in detail or merely referred to (such as a description of a string of a large multitude of networked logic gates, while only showing two because the ability to replicate more copies is obvious from the two illustrated,) though not necessarily fully illustrated, the arrangements of the paths, their lengths and timing, and their manners of providing opportunities for interconnections with various optical Kerr media as well as other input and output paths are fully flexible, with only the necessary well-known and well-handled (as shown in the parent applications as well as the incorporated references,) approaches to managing constraints of coherence maintenance, path length equivalence, etc. And as mentioned previously, any of a variety of forms of optical path technologies are usable as well including optical fibers, wave guides on silicon chip, and others.

In FIG. 2, a plurality of arrangements of potential optical Kerr media interactions are provided, by the arrangements of the optical Kerr medias 212, 214, 216, 218, 220, 222, 224, 226, 228, 230, 232, 234, 236, and 238. The specific number, placements, concurrencies, and further external interactions of any and all of these optical Kerr medias 212-238 are all adaptable, including increases, decreases, and sequencing. Phase shifting interactions such as in the description of FIG. 1 are available, of course, as well as those in which multiple optical Kerr medias 212-238 are disposed and concurrently occupied within a single self-interference section such as that of the upper quantum modifier 117h. In such a way, a self-interference section could be influenced to shift the phase, and hence switch the output state, by one of the optical Kerr media and then also switched by another different optical Kerr media so that the result would be that the presence of both would cancel each other out. A third optical Kerr media (not shown) could also be introduced so that the presence of 1 or 3 of the concurrencies would shift the phase and switch the state, while the presence of two or none would not.

Furthermore, the result of a phase shift in a first self-interference section of a first logic gate could alter the phase shift of a first self-interference section in a second logic gate which would then in turn, as a result of that first phase shift, output a different state which could then be arranged to alter the phase shift of a second self-interference section of the first logic gate. In other words, optical Kerr medias 212 and 236 could be arranged to enact a concurrency for a given pair of photon states traversing each of the pair of logic gates in the logic gate network embodiment 210 so that the phase of the state traversing optical Kerr media 212 is shifted, thereby causing that state to output on the path that traverses optical Kerr media 216. This output state traversing optical Kerr media 216 can also be arranged, to be concurrent with a state following the path traversing optical Kerr media 234, which would then enact a phase shift for the state traversing that self-interference section. It is readily apparent that the number, and complexity of these interactions and how they can be multiplied is in principle unlimited, though of course practical considerations are likely to constrain realizations at least somewhat, and all of the potential range of these networked configurations fall within the scope of the present invention.

In view of the above, it will be seen that the various objects and features of the invention are achieved and other advantageous results obtained. The examples contained herein are merely illustrative and are not intended in a limiting sense.

What is claimed is:

1. A photonic quantum logic gate with modifiable logic operation characteristics, comprising:
a first quantum differentiator that separates first and second orthogonal states of a first photon and inputs each for individual processing by first and second quantum modifiers, respectively;
said modifiers' processing involving a self-interference section operating in either a first or a second mode which output, respectively, either the same or the alternative of an input state;
at least a first path of at least one state of at least a second photon arranged to alter a mode of self-interference undergone by at least one of the first photon's states in at least one of the modifiers; and
a quantum integrator that assembles the first and second modifiers' outputs and channels them into a single unified output.

2. A photonic quantum logic gate with modifiable logic operation characteristics according to claim 1,
further comprising a second quantum differentiator that separates the first and second orthogonal photon states of the at least a second photon, and routes said states onto the first and a second path, respectively, such that at least one of the second photon's states alters the mode of self-interference undergone by at least one of the first photon's states in at least one of the modifiers.

3. A photonic quantum logic gate with modifiable logic operation characteristics according to claim 2,
wherein groupings of self-interference mode alterations spanning complete sets of permutations of the first and second photons' states are arranged to enact one or more logical operations.

4. A photonic quantum logic gate with modifiable logic operation characteristics according to claim 2,
wherein the self-interference mode alterations are engendered by routing at least a first portion of at least one modifiers' self-interference sections and by routing at least one of the second photon's states to both pass through at least a first Kerr media;
routings arranged so that when they are occupied the first and second photons traverse the first Kerr media concurrently to induce optical Kerr effect phase shifts that produce alterations in the mode of self-interference of the first photon.

5. A photonic quantum logic gate with modifiable logic operation characteristics according to claim 3,
wherein the first and second orthogonal photon states correspond to logical 0's and 1's, respectively, and the first and second photons correspond to the A and B inputs, respectively, of a standard logic table representation of a logic gate, and said logic operation is a NOR gate.

6. A photonic quantum logic gate with modifiable logic operation characteristics according to claim 3,
wherein the first and second orthogonal photon states correspond to logical 0's and 1's, respectively, and the first and second photons correspond to the A and B inputs, respectively, of a standard logic table representation of a logic gate, and said logic operation is a NAND gate.

7. A photonic quantum logic gate with modifiable logic operation characteristics according to claim 2,
with the first and second orthogonal photon states representing logical 0's and 1's, respectively, and the first and second photons representing the A and B inputs, respectively, of a standard logic table, wherein a NOR logic gate is engendered by said arranging entailing the second photon first state inducing the second mode of self-interference in both the first and second modifiers, and the second photon second state inducing the second mode of self-interference in only the second modifier.

8. A photonic quantum logic gate with modifiable logic operation characteristics according to claim 2,
with the first and second orthogonal photon states representing logical 0's and 1's, respectively, and the first and second photons representing the A and B inputs, respectively, of a standard logic table, wherein a NAND logic gate is engendered by said arranging entailing the second photon first state inducing the second mode of self-interference in only the first modifier, and the second photon second state inducing the second mode of self-interference in both the first and second modifiers.

9. A photonic quantum logic gate with modifiable logic operation characteristics according to claim 2,
wherein groupings of the self-interference mode alterations spanning complete sets of permutations of the first and second photons' states are arranged to enact one or more logical operations, and the self-interference mode alterations are engendered by routing at least a first portion of at least one of the first modifiers' self-interference sections and by routing at least one of the second photon's states to both pass through at least a first Kerr media concurrently;
said groupings of alterations, and said logical operation being thereby enacted, being modifiable by modifying said routings and the Kerr media they concurrently traverse.

10. A method of operating a photonic quantum logic gate with modifiable characteristics, comprising the steps of:
differentiating first and second orthogonal states of a first photon and separately inputting each for individual processing by first and second quantum modifiers, respectively;
said processing involving a self-interference procedure operating in either a first or a second mode which output, respectively, either the same or the alternative of an input state;
arranging for at least a first path of at least one state of at least a second photon to alter a mode of self-interference undergone by at least one of the first photon's states in at least one of the modifiers; and
integrating the first and second modifiers' outputs and channeling them into a single unified output.

11. A method of operating a photonic quantum logic gate with modifiable characteristics according to claim 10, further comprising the step of differentiating the first and second orthogonal photon states of the at least a second photon, and then routing them onto the first and a second path, respectively, such that at least one of the second photon's states alters the mode of self-interference undergone by at least one of the first photon's states in at least one of the modifiers.

12. A method of operating a photonic quantum logic gate with modifiable characteristics according to claim 11, wherein groupings of self-interference mode alterings spanning complete sets of permutations of the first and second photons' states are arranged to enact one or more logical operations, said self-interference mode alterings engendered by routing at least a first portion of at least one of the modifiers' self-interference sections and routing at least one of the second photon's states to both pass through at least a first Kerr media;

said routings arranged so that when they are occupied the first and second photons traverse the first Kerr media concurrently to induce optical Kerr effect phase shifts that produce alterings in the mode of self-interference of the first photon.

13. A method of operating a photonic quantum logic gate with modifiable characteristics according to claim 11, with said first and second orthogonal photon states corresponding to logical 0's and 1's, respectively, and the first and second photons corresponding to the A and B inputs, respectively, of a standard logic table representation of a logic gate; and wherein a NOR logic gate operation is engendered by said arranging entailing the second photon first state inducing the second mode of self-interference in both the first and second modifiers, and the second photon second state inducing the second mode of self-interference in only the second modifier.

14. A method of operating a photonic quantum logic gate with modifiable characteristics according to claim 11, with said first and second orthogonal photon states corresponding to logical 0's and 1's, respectively, and the first and second photons corresponding to the A and B inputs, respectively, of a standard logic table representation of a logic gate; and wherein a NAND logic gate operation is engendered by said arranging entailing the second photon first state inducing the second mode of self-interference in only the first modifier, and the second photon second state inducing the second mode of self-interference in both the first and second modifiers.

15. A method of operating a photonic quantum logic gate with modifiable characteristics according to claim 11, wherein groupings of the self-interference mode alterations spanning complete sets of permutations of the first and second photons' states are arranged to enact one or more logical operations, and self-interference mode alterations are engendered by routing at least a first portion of at least one of the first modifiers' self-interference procedures and by routing at least one of the second photon's states to both pass through at least a first Kerr media concurrently;

said groupings of alterations, and said logical operation being thereby enacted, being modifiable by modifying said routings and the Kerr media they concurrently traverse.

16. A network of photonic quantum logic gates that have modifiable logic operation characteristics, comprising:

first and second photonic logic gates operating on entering first and second photons, respectively, said gates each comprising, a first quantum differentiator that separates first and second orthogonal states of the entered photon and inputs said first and second states for individual processing by first and second quantum modifiers, respectively;

said modifiers' processing involving a self-interference section operating in either a first or a second mode which output, respectively, either the same or the alternative of an input state;

a self-interference mode undergone by at least one of the states of the entered photon in at least one of the first gate's modifiers being altered by at least one state of a different photon; and a quantum integrator that assembles the first and second modifiers' outputs and channels them into a single output;

wherein at least one output state of the self-interference section of at least one of the first logic gate's quantum modifiers is arranged to function as said at least one state of a different photon that alters the self-interference mode undergone by at least one of the second photon's states in at least one of the second logic gate's modifiers.

17. A network of photonic quantum logic gates that have modifiable logic operation characteristics according to claim 16, wherein self-interference mode alterations are engendered by routing at least a first portion of at least one of said modifiers' self-interference sections and by routing said at least one states of a different photon to both pass through at least a first Kerr media;

routings arranged so that, when both are occupied, occupying photon states traverse the first Kerr media concurrently to induce optical Kerr effect phase shifts that produce said self-interference mode alterations.

18. A network of photonic quantum logic gates that have modifiable logic operation characteristics according to claim 16, further wherein at least one output state of the self-interference section of at least one of the second logic gate's quantum modifiers is arranged to function as said at least one state of a different photon that alters the self-interference mode undergone by said at least one of the first photon's states in said at least one of the second logic gate's modifiers.

19. A network of photonic quantum logic gates that have modifiable logic operation characteristics according to claim 16, wherein at least one output state of the self-interference section of the second logic gate's first quantum modifier is arranged to function as said at least one state of a different photon that alters the self-interference mode undergone by the first photon's first state; and at least one output state of the self-interference section of the first logic gate's second quantum modifier is arranged to function as said at least one state of a different photon that alters the self-interference mode undergone by the second photon's second state.

20. A network of photonic quantum logic gates that have modifiable logic operation characteristics according to claim 16, wherein at least one output state of the self-interference section of the second logic gate's first quantum modifier is arranged to function as said at least one state of a different photon that alters the self-interference mode undergone by the first photon's first state; and at least one output state of the self-interference section of the first logic gate's first quantum modifier is arranged to function as said at least one state of a different photon that alters the self-interference mode undergone by the second photon's second state.

* * * * *